(12) United States Patent
Hognaland

(10) Patent No.: US 11,794,997 B2
(45) Date of Patent: *Oct. 24, 2023

(54) METHOD FOR OPERATING A BIN STORAGE SYSTEM AND ROBOT VEHICLE

(71) Applicant: Autostore Technology AS, Nedre Vats (NO)

(72) Inventor: Ingvar Hognaland, Nedre Vats (NO)

(73) Assignee: Autostore Technology AS, Nedre Vats (NO)

(*) Notice: Subject to any disclaimer, the term of this patent is extended or adjusted under 35 U.S.C. 154(b) by 0 days.

This patent is subject to a terminal disclaimer.

(21) Appl. No.: 17/653,622

(22) Filed: Mar. 4, 2022

(65) Prior Publication Data

US 2022/0185584 A1 Jun. 16, 2022

Related U.S. Application Data

(63) Continuation of application No. 16/865,443, filed on May 4, 2020, which is a continuation of application
(Continued)

(30) Foreign Application Priority Data

Dec. 10, 2012 (NO) .................................. 20121488

(51) Int. Cl.
*B65G 1/04* (2006.01)
*B65G 1/06* (2006.01)
(Continued)

(52) U.S. Cl.
CPC ......... *B65G 1/0464* (2013.01); *B65G 1/0407* (2013.01); *B65G 1/0478* (2013.01);
(Continued)

(58) Field of Classification Search
CPC .. B65G 1/0464; B65G 1/0478; B65G 1/0407; B65G 1/06; B65G 1/065; B65G 1/137;
(Continued)

(56) References Cited

U.S. PATENT DOCUMENTS 3,779,403 A 12/1973 Young
3,800,963 A 4/1974 Holland
(Continued)

FOREIGN PATENT DOCUMENTS

CH 640797 A5 1/1984
CN 1248954 A 3/2000
(Continued)

OTHER PUBLICATIONS

Onsagers Letter of Jan. 20, 2020 (18 pages).
(Continued)

*Primary Examiner* — Thomas Randazzo
(74) *Attorney, Agent, or Firm* — Osha Bergman Watanabe & Burton LLP

(57) ABSTRACT

A method of operating a bin storage system including a plurality of storage columns for the storage of a plurality of vertically-stacked storage bins, and a plurality of robot vehicles for transporting storage bins, the method includes: positioning a cavity of one of the plurality of robot vehicles such that it is aligned with one of the storage columns, receiving a storage bin from the storage column into the cavity, and moving the robot vehicle along the bin storage system, using a plurality of rolling members attached to the vehicle body about the cavity that are arranged for travelling in a first direction and a perpendicular second direction along the bin storage system.

17 Claims, 9 Drawing Sheets

Related U.S. Application Data

No. 16/589,158, filed on Oct. 1, 2019, now Pat. No. 10,696,478, which is a continuation of application No. 16/122,969, filed on Sep. 6, 2018, now Pat. No. 10,494,239, which is a continuation of application No. 15/818,791, filed on Nov. 21, 2017, now Pat. No. 10,093,525, which is a continuation of application No. 15/632,441, filed on Jun. 26, 2017, now Pat. No. 9,862,579, which is a continuation of application No. 15/411,301, filed on Jan. 20, 2017, now Pat. No. 9,856,082, which is a continuation of application No. 15/197,391, filed on Jun. 29, 2016, now Pat. No. 9,656,802, which is a continuation of application No. 14/650,757, filed as application No. PCT/EP2013/075671 on Dec. 5, 2013, now Pat. No. 9,422,108.

(51) Int. Cl.

| | |
|---|---|
| *B65G 1/137* | (2006.01) |
| *G05B 19/418* | (2006.01) |
| *B66F 9/06* | (2006.01) |
| *G06Q 10/08* | (2012.01) |
| *B66F 9/07* | (2006.01) |
| *G06Q 10/087* | (2023.01) |
| *G05D 1/00* | (2006.01) |
| *B65G 1/00* | (2006.01) |
| *G06K 17/00* | (2006.01) |
| *G06Q 10/00* | (2023.01) |

(52) U.S. Cl.
CPC .............. *B65G 1/06* (2013.01); *B65G 1/065* (2013.01); *B65G 1/137* (2013.01); *B65G 1/1371* (2013.01); *B66F 9/06* (2013.01); *B66F 9/063* (2013.01); *B66F 9/07* (2013.01); *G05B 19/41895* (2013.01); *G05D 1/0022* (2013.01); *G06Q 10/08* (2013.01); *G06Q 10/087* (2013.01); *B65G 1/00* (2013.01); *G05D 2201/0216* (2013.01); *G06K 17/00* (2013.01); *G06Q 10/00* (2013.01)

(58) Field of Classification Search
CPC ...... B65G 1/1371; B65G 1/00; B65G 1/0492; G05B 19/41895; B66F 9/06; B66F 9/063; B66F 9/07; G05D 1/0022; G05D 2201/0216; G06Q 10/08; G06Q 10/087; G06Q 10/00; G06K 17/00
See application file for complete search history.

(56) References Cited

U.S. PATENT DOCUMENTS

| | | | | |
|---|---|---|---|---|
| 4,088,232 A * | 5/1978 | Lilly | ............... | B65G 1/0464 414/282 |
| 4,265,582 A * | 5/1981 | Theobald | ............. | B65G 1/0485 414/281 |
| 4,470,742 A | 9/1984 | Schindler | | |
| 4,998,595 A | 3/1991 | Yeh | | |
| 5,180,334 A | 1/1993 | Nakane et al. | | |
| 5,190,427 A | 3/1993 | Lai | | |
| 5,201,819 A | 4/1993 | Shiraishi et al. | | |
| 6,471,309 B1 | 10/2002 | Turner | | |
| 6,654,662 B1 * | 11/2003 | Hognaland | ........... | B65G 1/0464 700/214 |
| 7,381,022 B1 | 6/2008 | King | | |
| 7,729,797 B2 | 6/2010 | Akamatsu et al. | | |
| 8,628,289 B1 * | 1/2014 | Benedict | ............... | B65G 1/0478 414/217 |
| 8,651,790 B2 | 2/2014 | Benedict et al. | | |
| 8,670,861 B2 | 3/2014 | Yoshinaga | | |
| 8,731,740 B2 | 5/2014 | Ogawa | | |
| 8,734,079 B1 | 5/2014 | Razumov | | |
| 9,004,840 B2 | 4/2015 | Kinugawa et al. | | |
| 9,020,636 B2 | 4/2015 | Tadayon | | |
| 9,168,930 B2 | 10/2015 | Wada | | |
| 9,422,108 B2 | 8/2016 | Hognaland | | |
| 9,656,802 B2 | 5/2017 | Hognaland | | |
| 9,682,822 B2 | 6/2017 | Lindbo et al. | | |
| 9,856,082 B2 | 1/2018 | Hognaland | | |
| 9,862,579 B2 | 1/2018 | Hognaland | | |
| 10,000,337 B2 | 6/2018 | Lindbo et al. | | |
| 10,093,525 B2 | 10/2018 | Hognaland | | |
| 10,577,178 B2 | 3/2020 | Lindbo et al. | | |
| 10,696,478 B2 * | 6/2020 | Hognaland | ............ | B65G 1/065 |
| 2003/0229416 A1 * | 12/2003 | Tai | ............ | B65G 1/06 700/213 |
| 2004/0165974 A1 | 8/2004 | Gironi et al. | | |
| 2004/0211606 A1 | 10/2004 | Prucher | | |
| 2005/0191160 A1 | 9/2005 | Melin et al. | | |
| 2005/0225275 A1 | 10/2005 | Eskritt et al. | | |
| 2006/0182552 A1 | 8/2006 | Jiang et al. | | |
| 2007/0059132 A1 | 3/2007 | Akamatsu et al. | | |
| 2007/0125727 A1 | 6/2007 | Winkler | | |
| 2008/0075568 A1 | 3/2008 | Benedict et al. | | |
| 2008/0075569 A1 | 3/2008 | Benedict et al. | | |
| 2008/0226437 A1 | 9/2008 | de Milly | | |
| 2008/0289309 A1 | 11/2008 | Gust et al. | | |
| 2009/0074545 A1 | 3/2009 | Lert, Jr. et al. | | |
| 2009/0136331 A1 | 5/2009 | Muser | | |
| 2010/0301712 A1 | 12/2010 | Amutham | | |
| 2011/0168465 A1 | 7/2011 | Starr | | |
| 2011/0259658 A1 | 10/2011 | Huang et al. | | |
| 2012/0118845 A1 | 5/2012 | Wada | | |
| 2012/0152877 A1 | 6/2012 | Tadayon | | |
| 2012/0189411 A1 | 7/2012 | Yoshinaga | | |
| 2012/0215389 A1 | 8/2012 | Perry et al. | | |
| 2013/0049549 A1 | 2/2013 | Folmli et al. | | |
| 2013/0099554 A1 | 4/2013 | Lee | | |
| 2013/0103248 A1 | 4/2013 | Ogawa | | |
| 2013/0142597 A1 | 6/2013 | Kinugawa et al. | | |
| 2013/0307450 A1 | 11/2013 | Fuller et al. | | |
| 2014/0015382 A1 | 1/2014 | Kim | | |
| 2014/0035347 A1 | 2/2014 | Zanfei et al. | | |
| 2014/0086714 A1 | 3/2014 | Malik | | |
| 2014/0113828 A1 | 4/2014 | Gilbert et al. | | |
| 2014/0133943 A1 | 5/2014 | Razumov | | |
| 2014/0148985 A1 | 5/2014 | Sato et al. | | |
| 2014/0191624 A1 | 7/2014 | Jahshan | | |
| 2015/0127143 A1 | 5/2015 | Lindbo et al. | | |
| 2015/0307276 A1 | 10/2015 | Hognaland | | |
| 2015/0375388 A1 | 12/2015 | Ullrich | | |
| 2016/0129587 A1 | 5/2016 | Lindbo et al. | | |
| 2016/0145058 A1 | 5/2016 | Lindbo | | |
| 2016/0194151 A1 | 7/2016 | Lindbo et al. | | |
| 2017/0129703 A1 | 5/2017 | Lindbo et al. | | |
| 2017/0129706 A1 | 5/2017 | Hognaland | | |
| 2019/0225436 A1 | 7/2019 | Lindbo et al. | | |
| 2020/0307911 A1 | 10/2020 | Austrheim et al. | | |

FOREIGN PATENT DOCUMENTS

| | | |
|---|---|---|
| CN | 1288287 A | 3/2001 |
| CN | 1454179 A | 11/2003 |
| CN | 103612882 A | 3/2014 |
| CN | 103818672 A | 5/2014 |
| CN | 204046343 U | 12/2014 |
| CN | 104837747 A | 8/2015 |
| DE | 1556071 A1 | 9/1969 |
| DE | 199 35 742 A1 | 2/2001 |
| DE | 102009017241 A1 | 10/2010 |
| DE | 102010047872 A1 | 5/2011 |
| DE | 102009017241 B4 | 12/2016 |
| DK | 2562072 T3 | 5/2015 |
| EP | 34154 A1 | 8/1981 |
| EP | 34154 B1 | 5/1984 |
| EP | 1037828 B1 | 9/2003 |
| EP | 2308778 A2 | 4/2011 |
| EP | 2479052 A1 | 7/2012 |
| EP | 2562072 A1 | 2/2013 |
| EP | 2765018 A3 | 7/2015 |

(56) References Cited

FOREIGN PATENT DOCUMENTS

| | | | |
|---|---|---|---|
| EP | 3050824 A1 | 8/2016 | |
| EP | 3152998 B1 | 4/2017 | |
| EP | 2962962 B1 | 4/2018 | |
| EP | 3157847 B1 | 4/2018 | |
| EP | 3070027 B1 | 11/2018 | |
| EP | 2928794 B1 | 3/2019 | |
| EP | 3050824 B1 | 10/2019 | |
| FR | 2730715 A1 | 8/1996 | |
| GB | 2514930 A | 12/2014 | |
| GB | 2520104 A | 5/2015 | |
| JP | S49-83778 U | 7/1974 | |
| JP | S4983778 A | 8/1974 | |
| JP | S56011969 A | 2/1981 | |
| JP | S56011969 U | 3/1981 | |
| JP | S57124503 A | 8/1982 | |
| JP | S57124503 U | 8/1982 | |
| JP | S57125895 A | 8/1982 | |
| JP | H04235822 A | 8/1992 | |
| JP | H10203647 A | 8/1998 | |
| JP | H10278596 A | 10/1998 | |
| JP | 10299280 A * | 11/1998 | ............... B65G 1/04 |
| JP | H10299280 A | 11/1998 | |
| JP | H11165980 A | 6/1999 | |
| JP | H11278607 A | 10/1999 | |
| JP | 2000134185 A | 5/2000 | |
| JP | 2001522342 A | 11/2001 | |
| JP | 2004014749 A | 1/2004 | |
| JP | 2012116651 A | 6/2012 | |
| JP | 1983778 B2 | 7/2012 | |
| JP | 2016183050 A | 10/2016 | |
| KR | 100555037 B1 | 3/2006 | |
| NO | 317366 B1 | 10/2004 | |
| NO | 20121488 A1 * | 6/2014 | ............... B65G 1/04 |
| NO | 20121488 A1 * | 6/2014 | ........... B65G 1/0464 |
| NO | 20140773 A1 | 12/2015 | |
| TW | 575409 B | 2/2004 | |
| TW | I233913 B2 | 6/2005 | |
| TW | I233913 B | 6/2005 | |
| WO | 1998049075 A1 | 11/1998 | |
| WO | 2005/077789 A1 | 8/2005 | |
| WO | 2007007354 A1 | 1/2007 | |
| WO | 2007043129 A1 | 4/2007 | |
| WO | 2013/167907 A1 | 11/2013 | |
| WO | WO-2013167907 A1 * | 11/2013 | ........... B65G 1/0464 |
| WO | 2014/090684 A1 | 6/2014 | |
| WO | 2014/195901 A1 | 12/2014 | |
| WO | 2014/203126 A1 | 12/2014 | |
| WO | 2014195902 A1 | 12/2014 | |
| WO | 2014205523 A2 | 12/2014 | |
| WO | 2015019055 A1 | 2/2015 | |
| WO | WO-2015019055 A1 * | 2/2015 | ............. B61B 13/00 |
| WO | 2015/140216 A1 | 9/2015 | |
| WO | 2015/193278 A1 | 12/2015 | |
| WO | 2016/120075 A1 | 8/2016 | |

OTHER PUBLICATIONS

Onsagers Letter of Feb. 6, 2018 (11 pages).
Image Supporting Art. 123 (1 page).
Definition of Robot (5 pages).
Images from D13 (3 pages).
Tharsus Written Submission of Apr. 13, 2021 (13 pages).
PTAB Decision—Paper 10, dated Jul. 21, 2021 (25 pages).
PTAB Decision—Paper 9, Dated Jul. 21, 2021 (41 pages).
PTAB Decision—Paper 11, Dated Aug. 4, 2021 (36 pages).
Guzior Letter mailed Aug. 10, 2021 (2 pages).
PTAB—Paper 12, Dated Jun. 3, 2021 (45 pages).
AutoStore's Further Response to Ocado's 2-5 Pt. 18 Request, Feb. 18, 2021.
European Decision and Minutes issued in counterpart European Application No. 16166677.1 mailed Aug. 18, 2021 (40 pages).
Third Party Observation dated Mar. 17, 2020 (2 pages).
Third Party Observation dated Jun. 22, 2021 (3 pages).
Third Party Observation dated Jun. 22, 2021 (14 pages).
Third Party Observation dated Jun. 21, 2021 (4 pages).
Third Party Observation dated Jul. 14, 2021 (16 pages).
Complainants' Post-Hearing Brief, Sep. 14, 2021 (418 pages).
Respondents' Initial Post-Hearing Reply Brief, Sep. 16, 2021 (324 pages).
Respondents' Post-Hearing Reply Brief, Sep. 16, 2021 (169 pages).
Complainants' Reply Post-Hearing Brief, Sep. 23, 2021 (380 pages).
Appeal Grounds 03 of Dec. 21, 2021 (53 pages).
Appeal Grounds 02 of Dec. 21, 2021 (42 pages).
Appeal Grounds 01 of Dec. 24, 2021 (13 pages).
Public Ocado Contingent Petition for Review of Final Initial Determination of No Violation (104 pages).
Public Ocado Summary Contingent Petition for Review of Final ID of No Violation (13 pages).
Public Initial Determination of Violation of Section 337 and RD on Remedy and Bonding (182 pages).
Public Autostore Summary of Petition for Commission Review (14 pages).
Public Autostore Petition for Commission Review (112 pages).
International Search Report issued in PCT/EP2013/075671 dated Feb. 11, 2014 (4 pages).
International Preliminary Reporton Patentability from PCT/EP2013/075671 dated Mar. 12, 2016 (11 pages).
German Search Report issued in 20121488 dated Jun. 14, 2013 (2 pages).
Office Action in corresponding Chinse application No. 2013800643531 dated Dec. 23, 2015 (14 pages).
International Search Report issued in PCT/EP2013/075671 dated Feb. 11, 2014 (3 pages).
International Preliminary Reporton Patentability from PCT/EP2013/075671 dated Mar. 12, 2016 (12 pages).
Norwegian Search Report issued in 20121488 dated Jun. 14, 2013 (2 pages).
Notice of Allowance issued in corresponding U.S. Appl. No. 14/650,757, dated Apr. 4, 2016 (8 pages).
Office Action issued in counterpart Taiwanese Patent Application No. 105126793, dated May 16, 2017 (8 pages).
Office Action in corresponding Japanese application No. 2016-163657 dated Oct. 2, 2017 (15 pages).
Office Action in corresponding Japanese application No. 2016-144358 dated Sep. 27, 2017 (10 pages).
Office Action in corresponding Japanese application No. 2015-546014 dated Oct. 2, 2017 (21 pages).
Autostore Public Complaint, Oct. 1, 2020.
Ocado's supplemental response to complainants' interrogatory, Feb. 2, 2021.
Respondents'joint disclosure of initial invalidity and unenforceability contentions, Feb. 16, 2021.
Appendix A-1 : Invalidity Claim Chart for U.S. Pat. No. 10,093,525.
Appendix A-2 : Invalidity Claim Chart for U.S. Pat. No. 10,093,525.
Appendix A-3 : Invalidity Claim Chart for U.S. Pat. No. 10,093,525.
Appendix B-1 : Invalidity Claim Chart for U.S. Pat. No. 10,494,239.
Appendix B-2 : Invalidity Claim Chart for U.S. Pat. No. 10,494,239.
Appendix B-3 : Invalidity Claim Chart for U.S. Pat. No. 10,494,239.
Appendix C-1 : Invalidity Claim Chart for U.S. Pat. No. 10,696,478.
Appendix C-2 : Invalidity Claim Chart for U.S. Pat. No. 10,696,478.
Appendix C-3 : Invalidity Claim Chart for U.S. Pat. No. 10,696,478.
Appendix D-1 : Invalidity Claim Chart for U.S. Pat. No. 10,474,140.
Appendix D-2 : Invalidity Claim Chart for U.S. Pat. No. 10,474,140.
Appendix D-3 : Invalidity Claim Chart for U.S. Pat. No. 10,474,140.
Appendix D-4 : Invalidity Claim Chart for U.S. Pat. No. 10,474,140.
Appendix E-1 : Invalidity Claim Chart for U.S. Pat. No. 10,294,025.
Appendix E-2 : Invalidity Claim Chart for U.S. Pat. No. 10,294,025.
Appendix E-3 : Invalidity Claim Chart for U.S. Pat. No. 10,294,025.
Appendix F-1 : Invalidity Claim Chart for U.S. Pat. No. 10,294,025.
Appendix F-2 : Invalidity Claim Chart for U.S. Pat. No. 10,093,525.
Appendix F-3 : Invalidity Claim Chart for U.S. Pat. No. 10,494,239.
Appendix F-4 : Invalidity Claim Chart for U.S. Pat. No. 10,696,478.
Appendix G : Claim Chart Comparing Claims of U.S. Pat. No. 10,577,178 with GB Appl. No. GB1314313.6.
Respondents' supplemental joint disclosure of initial invalidity and unenforceability contentions, Feb. 19, 2021.

(56) References Cited

OTHER PUBLICATIONS

Parties' Proposed Claim Constructions, Feb. 23, 2021.
Ocado Respondents' Amended Response to the Notice of Investigation and Complaint of complainant Autostore, Apr. 14, 2021.
Respondents Notice of Prior Art, Mar. 18, 2021.
AutoStore's Claim Form, Oct. 1, 2020.
AutoStore's Particulars of Claim, Oct. 10, 2020.
AutoStore's Particulars of Infringement, Oct. 1, 2020.
Ocado's Defence and Counterclaim, Dec. 14, 2020.
Ocado's Grounds of Invalidity, Dec. 14, 2020.
AutoStore's Reply and Defence to Counterclaim, Jan. 25, 2021.
Ocado's Reply to Defence to Counterclaim, Feb. 9, 2021.
Autostore's Response to Ocado's 1-2 Pt. 18 Request, Feb. 4, 2021.
AutoStore's Response to Ocado's 2-5 Pt. 18 Request, Feb. 15, 2021.
Statement of Case on Norwegian Law and Confidential Disclosure, Mar. 19, 2021.
Joint Disclosure Review Document, Apr. 20, 2021.
Certified priority document, PCT/EP2015/063415.
Annex A To Defence and Counterclaim, Feb. 14, 2020.
Annex B To Defence and Counterclaim, Dec. 14, 2020.
Annex C To Defence and Counterclaim, Dec. 14, 2020.
Annex D To Defence and Counterclaim, Dec. 14, 2020.
Annex 1 To Grounds of Invalidity, EVS Webpage, Dec. 20, 2014.
Annex 2 To Grounds of Invalidity, Norwegian articles updated, Dec. 14, 2020.
Annex 3 To Grounds of Invalidity, Certificate, Dec. 14, 2020.
Annex 4 To Grounds of Invalidity, Bank Bot design docs, Dec. 14, 2020.
Annex 5 To Grounds of Invalidity, Large Autostore Document, Dec. 14, 2020.
Annex A To Reply and Defence To Counterclaim, Jan. 25, 2021.
Annex B To Reply and Defence To Counterclaim, Jan. 25, 2021.
Annex C To Reply and Defence To Counterclaim, Jan. 25, 2021.
Appendix H : Chart of Evidence Supporting Respondents' Claim Constructions.
Ocado Group PLC's Petition for Inter Partes Review, Nov. 30, 2020.
Exhibit 1001 U.S. Appl. No. 10/294,025 B2.
Exhibit 1001 Corrected U.S. Pat. No. 10/294,025.
Exhibit 1002 EDVA Complaint.
Exhibit 1003 Corrected U.S. Pat. No. 10/577,178.
Exhibit 1003 U.S. Appl. No. 10/577,178 B2.
Exhibit 1004 Corrected Great Britain Patent App No. GB1314313.
Exhibit 1004 Great Britain Patent App No. GB1314313.
Exhibit 1005 Corrected Great Britain Patent App Pub No. GB2520104.
Exhibit 1005 Great Britain Patent App Pub No. GB2520104.
Exhibit 1006 Corrected Complainants Statement on the public interest, Oct. 1, 2020.
Exhibit 1006 Complainants Statement on the public interest, Oct. 1, 2020.
Exhibit 1007 Corrected Espacenetnet Bibliographic Data page.
Exhibit 1007 Espacenetnet Bibliographic Data Page for PCT GB2014052273.
Exhibit 1008 Corrected Declaration of Brian Pfeifer, Ph.D, P.E, Nov. 30, 2020.
Exhibit 1008 Declaration of Brian Pfeifer, Ph.D, P.E, Nov. 30, 2020.
Exhibit 1009 Corrected Norwegian Patent App No. NO20140773.
Exhibit 1009 Norwegian Patent App No. 20140773.
Exhibit 1010 Corrected PCT App Pub No. WO2014195901.
Exhibit 1010 PCT App Pub No. WO2014195901.
Exhibit 1011 Corrected PCT App Pub No. WO2005077789.
Exhibit 1011 PCT App Pub No. WO2005077789.
Exhibit 1012 Corrected Applicant Remarks, Reply under 37 CFR 1.111, Sep. 27, 2018.
Exhibit 1012 Applicant Remarks, Reply under 37 CFR 1.111, Sep. 27, 2018.
Exhibit 1013 Certified Office Copy from the UK Intellectual Property Office, re GB1314313, dated Nov. 18, 2020.
Exhibit 1013 Corrected Certified Office Copy from the UK Intellectual Property Office, re GB1314313, dated Nov. 18, 2020.
Exhibit 1014 Corrected Final Action (USPTO), dated Dec. 18, 2018.
Exhibit 1014 Final Action (USPTO), dated Dec. 18, 2018.
Exhibit 1015 Corrected IDS, Dec. 15, 2016.
Exhibit 1015 IDS, Dec. 15, 2016.
Exhibit 1016 Corrected Notice of Allowance, dated Oct. 22, 2019.
Exhibit 1016 Notice of Allowance, dated Oct. 22, 2019.
Complaint from Ocado, Feb. 2, 2021.
Exhibit 12, The "Oslo District Court Pleading".
Exhibit 61, Reply and defence to counterclaim, in the High Court Of Justice Business And Property Courts Of England And Wales.
Exhibit 62, Import records.
Exhibit 63, Press release Haugesund Avis.
Onsagers Letters to EPO dated Mar. 11, 2021 (1 page).
Abitz & Partner—Letter dated Mar. 15, 2021 (2 pages).
EPO Provisions of the Minutes and Decision dated Jun. 17, 2021 (144 pages).
EPO Preliminary Opinion dated Apr. 12, 2021 (3 pages).
Abitz & Partner—Written Submission dated Apr. 22, 2021 (12 pages).
Onsagers Written Submission dated Apr. 22, 2021 (18 pages).
Tharsus Written Submission dated May 21, 2021 (7 pages).
Ocado Solutions Written Submission dated May 21, 2021 (7 pages).
Annotated D13 Drawings filed May 21, 2021 (1 page).
Abitz & Partner Written Submission dated Jun. 14, 2021 (2 pages).
Interlocutory Decision in Opposition Proceedings in the counterpart European Patent Application No. 13807954.6, mailed on Apr. 11, 2022 (55 pages).
United States International Trade Commission Opinion dated Mar. 17, 2022 (27 pages).
Onsagers Written Submission dated May 24, 2022 (22 pages).
Onsagers Written Submission dated Jun. 29, 2022 (4 pages).
Onsagers Written Submission dated Jul. 6, 2022 (1 page).
Communication from Boards of Appeal regarding Written Submission (Appeal No. T1808/21-3.2.07) of May 19, 2022, from Opponent 03 (Ocado); dated May 25, 2022 (46 pages).
Communication from Boards of Appeal regarding Written Submission (Appeal No. T1808/21-3.2.07) of May 19, 2022, from Opponent 02 (Tharsus); dated May 25, 2022 (46 pages).
Communication from Boards of Appeal regarding letter of Jul. 27, 2022, from Opponent 03 (Ocado); dated Aug. 1, 2022 (4 pages).
Communication from Boards of Appeal regarding letter of Jul. 27, 2022, from Opponent 02 (Tharsus); dated Aug. 1, 2022 (4 pages).
Onsagers Written Appeal Submission dated Jun. 29, 2022 (2 pages).
Onsagers Written Appeal Submission dated Jul. 6, 2022 (1 page).
Communication from Boards of Appeal regarding Written Submission (Appeal No. T1850/21-3.2.07) of May 19, 2022, from Opponent 03 (Ocado); dated May 25, 2022 (47 pages).
Communication from Boards of Appeal regarding Written Submission (Appeal No. T1850/21-3.2.07) of May 19, 2022, from Opponent 02 (Tharsus); dated May 25, 2022 (47 pages).
Communication from Boards of Appeal (Appeal No. T1850/21-3.2.07) regarding Reply of Jul. 4, 2022, from Opponent 03; dated Jul. 8, 2022 (27 pages).
Communication from Boards of Appeal (Appeal No. T1850/21-3.2.07) regarding Reply of Jul. 5, 2022, from Opponent 02; dated Jul. 8, 2022 (27 pages).
Communication from Boards of Appeal (Appeal No. T1850/21-3.2.07) regarding Reply of Jul. 4, 2022, from Opponent 01; dated Jul. 7, 2022 (26 pages).
Abitz & Partner—Statement of Grounds of Appeal dated Aug. 19, 2022 (73 pages).
Onsagers—Grounds of Appeal mailed Aug. 18, 2022 (5 pages).
Abel & Imray—Grounds of Appeal mailed Aug. 19, 2022 (1 page).
English Translation of German Application No. 10 2009 017 241.6 (10 pages).
Ocado Grounds of Appeal against Decision of Opposition Division of Apr. 11, 2022 dated Aug. 19, 2022 (72 page).
Tharsus Grounds of Appeal against Decision of Opposition Division of Apr. 11, 2022 dated Aug. 19, 2022 (59 page).
Decision Denying Institution of Inter Partes Review (26 pages).
Jul. 22, 2021—ITC Inv. 1228 Claim Construction Order.
Aug. 9, 2022—Final Rejection in U.S. Appl. No. 17/106,209.
Apr. 30, 2020—Autostore's Reply to the Notice of Opposition to EP Pat # 3250481.

(56) References Cited

OTHER PUBLICATIONS

Nov. 30, 2020—Autostore's Reply to the Notice of Opposition to EP Pat # 3050824.
Mar. 17, 2022—ITC Inv. 1228 Commission Opinion.
Sep. 9, 2022—Letter from Elliot to Scherer.
Sep. 9, 2022—Table of Material Information.
Paper 1 Petition of Mar. 4, 2022.
Paper 6—Patent Owner Preliminary Response of Jun. 16, 2022.
Paper 7—Decision Granting Institution of IPR of Sep. 14, 2022.
AS-1003.
AS-1009.
AS-1010.
EX2001 Declaration of Dr. Pfeifer.
EX2012 IPR2021-00398 DDI.
41 EPO—Privisional Opinion from BOA of Sep. 8, 2022.
32 Tharsus—Reply to Written Submission From Proprietor of Jul. 27, 2022.
33 Ocado—Reply to Written Submission from Prioprietor of Jul. 27, 2022.
34 Onsagers—Reply to Opponents Reply to our Grounds of Sep. 6, 2022.
35 EPO—Provisional Opinion of BOA of Sep. 8, 2022.
36 EPO—Additional Preliminary Opinion of BOA of Sep. 15, 2022.
Decision revoking the European Patent issued in European Application No. 15172286.5; Oct. 7, 2021 (44 pages).
Onsagers; Grounds of Appeal against decision in Opposition against EP2962962 Autostore Technology AS; Feb. 17, 2022 (14 pages).
Onsagers; European Patent No. EP2928794—Autostore Technology AS, Response to Appellant(s)/Opponent(s) Grounds of Appeal; Dec. 22, 2022 (50 pages).
Abitz & Partner; Reply to Proprietors Grounds of Appeal; P23135EPPC; Jan. 3, 2023 (5 pages).
Ocado; Reply to Proprietors Grounds of Appeal; P23135EPPC; Jan. 3, 2023 (4 pages).
Tharsus; Reply to Proprietors Grounds of Appeal; P23135EPPC; Jan. 5, 2023 (5 pages).
Abitz & Partner; Written submission—procedural matter; P23135EPPC01; Jan. 25, 2023 (2 pages).
Abitz & Partner; Written submission; P23135EPPC01; Jan. 25, 2023 (2 pages).
Ocado; Written submission—procedural matter; P23135EPPC01; Jan. 26, 2023 (2 pages).
Tharsus; Written submission—accompanying persons; P23135EPPC01; Jan. 26, 2023 (2 pages).
Abitz & Partner; Written submission—special relationship; P23135EPPC02; Jan. 25, 2023 (10 pages).
Onsagers; Contact details and accompanying persons; P23135EPPC01; Jan. 27, 2023 (2 pages).
Abitz & Partner; Written submission—procedural matter; P23135EPPC02; Jan. 25, 2023 (2 pages).
Ocado; Written submission—procedural matter; P23135EPPC02; Jan. 26, 2023 (2 pages).
Tharsus; Written submission—accompanying persons; P23135EPPC02; Jan. 26, 2023 (2 pages).
Onsagers; Contact details and accompanying persons; P23135EPPC02; Jan. 27, 2023 (2 pages).
Annex—Table summarizing case law on special relationship—P23135EPPC02 (7 pages).

P. England et al. "A Practitioner's Guide to European Patent Law. For National Practice and the Unified Patent Court" 2nd Edition; 2022 (6 pages).
EPO Technical Board of Appeal; Observations of Rt Hon Professor Sir Christopher Floyd Jan. 25, 2023 (3 pages).
Onsagers; Reply to Opposition in European patent No. 3372534 Autostore Technology As; P23135EPPC04; Apr. 15, 2023 (42 pages).
Onsagers; Written Submission related to conclusion of EP2928794 Autostore Technology AS; P23135EPPC; Mar. 22, 2023 (14 pages).
Onsagers; Reply to Opponents' Submission of 25-26, and Jan. 31, 2023; EP2962962 Autostore Technology AS; P23135EPPC01; Feb. 2, 2023 (3 pages).
Communication in Reply to Proprietors Submissions issued in European Application No. 15172286.5; Feb. 9, 2023 (2 pages).
Abitz & Partner; Additional submission—special relationship; P23135EPPC02 Feb. 1, 2023 (4 pages).
Onsagers; Written Submission Representatives Autostore Technology AS; P23135EPPC01; Feb. 17, 2023 (1 page).
Onsagers; Reply to Opponents Submissions of 25-26 and Jan. 31 and Feb. 1, 2023; P23135EPPC02; Feb. 2, 2023 (3 pages).
Onsagers; Written Submission related to conclusion of EP2962962 Autostore Technology AS; P23135EPPC01; Feb. 17, 2023 (1 page).
Change of venue for oral proceedings in-person issued in European Application No. 16166677.1; Feb. 2, 2023 (2 pages).
Minutes of Oral Proceedings from Board of Appeal issued in European Application No. 15172286.5; Mar. 6, 2023 (5 pages).
Closure of the Appeal Proceedings from Boards of Appeal issued in European Application No. 15172286.5; Mar. 6, 2023 (1 page).
Communication in Reply to Proprietor's Submissions from Boards of Appeal issued in European Application No. 16166677.1; Feb. 9, 2023 (2 pages).
Onsagers; Written Submission Representatives related to EP3070027 Autostore Technology AS; P23135EPPC02; Feb. 17, 2023 (1 page).
Onsagers; Written Submission Regarding Oral Submission related to EP3070027 Autostore Technology AS; P23135EPPC02; Feb. 17, 2023 (2 pages).
Onsagers; Written Submission Question of Referral related to EP3070027 Autostore Technology AS; P23135EPPC02; Feb. 17, 2023 (3 pages).
Onsagers; Written Submission Further Regarding Referral of EP3070027 Autostore Technology AS; P23135EPPC02; Feb. 22, 2023 (4 pages).
Onsagers; Written Submission Further Speaker of EP3070027 Autostore Technology AS; P23135EPPC02; Feb. 24, 2023 (1 page).
Minutes of the Oral Proceedings from Boards of Appeal issued in European Application No. 16166677.1; Mar. 6, 2023 (6 pages).
Onsagers; Written Submission Correction to Minutes of EP3070027 Autostore Technology AS; P23135EPPC02; Mar. 10, 2023 (1 page).
Corrected Minutes of the Oral Proceedings from Boards of Appeal issued in European Application No. 16166677.1; Mar. 16, 2023 (6 pages).
Decision from Boards of Appeal issued in European Application No. 16166677.1; Apr. 3, 2023 (35 pages).
Declaration of Rt Hon Professor Sir Robin Jacob; EPO Technical Board of Appeal; Feb. 15, 2023 (4 pages).
Declaration of Professor Adrian Briggs; Feb. 16, 2023 (4 pages).
AutoStores Written Closings for Trail of the Foreign Law Issues; P23135EPPC; Mar. 21, 2022 (79 pages).

* cited by examiner

METHOD FOR OPERATING A BIN STORAGE SYSTEM AND ROBOT VEHICLE

CROSS-REFERENCE TO RELATED APPLICATIONS

The present application is a continuation application of and, thereby, claims benefit under 35 U.S.C. § 120 to U.S. patent application Ser. No. 16/865,443 filed May 4, 2020, which is a continuation of U.S. patent application Ser. No. 16/589,158 filed Oct. 1, 2019, which is a continuation of U.S. patent application Ser. No. 16/122,969 filed Sep. 6, 2018, which is a continuation of U.S. patent application Ser. No. 15/818,791 filed Nov. 21, 2017, which is a continuation of U.S. application Ser. No. 15/632,441 filed Jun. 26, 2017, which is a continuation of U.S. patent application Ser. No. 15/411,301 filed Jan. 20, 2017, which is a continuation of U.S. patent application Ser. No. 15/197,391 filed Jun. 29, 2016, which is a continuation of U.S. patent application Ser. No. 14/650,757 filed Jun. 9, 2015, which is a U.S. National Stage of international application PCT/EP2013/075671 filed Dec. 5, 2013, which claims foreign priority to Norwegian Patent Application No. NO 20121488 filed Dec. 10, 2012.

FIELD OF INVENTION

The present invention relates to a remotely operated vehicle for picking up storage bins from a storage system and a storage system using the inventive vehicle.

A remotely operated vehicle for picking up storage bins from a storage system is known. A detailed description of a relevant prior art storage system is given in WO 98/49075. Further, details of a prior art vehicle being suitable for such a storage system is disclosed in Norwegian patent NO317366. More specifically the prior art storage system comprises a three-dimensional storage grid containing storage bins that are stacked on top of each other to a certain height. The storage grid is normally constructed as aluminium columns interconnected by top rails. A number of remotely operated vehicles, or robots, are arranged on the top rails. Each vehicle is equipped with a lift for picking up, carrying, and placing bins that are stored inside the storage grid.

Such a prior art storage system art and prior art robot is illustrated in FIGS. 1 and 2, respectively. The storage system 3 comprises a robot 1 which is arranged to move on dedicated supporting rails 13 and to receive a storage bin 2 from a storage column 8 within a bin storing grid 15. The storage system 3 includes a plurality of such robots 1 and a dedicated bin lift device 50, the latter being arranged to receive a storage bin 2 from the robot 1 at the top level of the bin storing grid 15 and to convey the storage bin 2 down in a vertical direction to a delivery station 60.

However, the prior art robot 1 shown in both FIG. 1 and FIG. 2 suffers from several important disadvantageous during their operation. Firstly, the particular design of the robot prevents access to all off the available storage columns in the storage system. Furthermore, this particular design may cause an undesirable high torque during lifting and transportation of storage bins, thereby creating potential instability problems, as well as a clear limitation of the robots maximum handling weight. An additional disadvantage caused by the prior art robot design is the fact that only one particular bin and one particular bin height may be accepted for each type of robot in order to ensure adequate stability. Finally, the presence of an integrated yoke/overhang in the upper part of the section receiving the storage bin necessitates an undesired speed reduction at the final stage of the lifting process performed by the yoke suspended vehicle lifting device.

SUMMARY

One or more embodiments of the present invention solve, or at least substantially alleviate, the above-described disadvantageous, i.e., provide a vehicle/robot with higher stability properties, higher maximum handling weights, a more effective use of available space during operation and a less time consuming lifting and transporting process of storage bins.

In particular, one or more embodiments of the present invention relate to a remotely operated vehicle or robot for picking up storage bins from a storage system. The inventive vehicle or robot comprises a vehicle body, which vehicle body further comprises a first section for storing vehicle driving means and a second section for receiving any storage bin stored in a storage column within the storage system, a vehicle lifting device which is at least indirectly connected to the vehicle body in order to lift the storage bin into the second section, a first set of vehicle rolling means connected to the vehicle body in order to allow movement of the vehicle along a first direction (X) within the storage system during use and a second set of vehicle rolling means connected to the vehicle body in order to allow movement of the vehicle along a second direction (Y) in the storage system during use. The second direction (Y) is oriented perpendicular to the first direction (X).

The inventive vehicle is characterized in that the second section comprises a cavity arranged centrally within the vehicle body. This cavity has at least one bin receiving opening facing towards the underlying storage columns during use. In addition, at least one of the two sets of vehicle rolling means is arranged fully within the vehicle body.

In order to allow easy entrance of the storage bin into the central cavity, its volume should be larger than the largest storage bin intended to be picked from the storage system. Likewise, the cross sectional area of at least one of the at least one bin receiving opening should be larger than the cross sectional area of the storage bin walls oriented parallel to the cavity opening(s).

The vehicle may further comprise means for reversibly and selectively displacing either the first set of vehicle rolling means or the second vehicle rolling means away from an underlying vehicle support within the storage system during a change of vehicle direction between the first direction (X) and the second direction (Y).

Furthermore, in an embodiment the first section may be arranged relative to the second section in such a way that the cross section of the vehicle parallel to the underlying vehicle support deviates from a quadratic shape.

In a preferred embodiment the vehicle body covers less or equal to the lateral cross sectional area of one central storage column in the first direction (X) and covers the lateral cross sectional area of more than one central storage column in the second direction (Y) during use. In a more specific example the vehicle body extends beyond the lateral cross sectional area of the central storage column at both sides facing the second direction (Y), i.e. covering also some of the cross sectional areas of the adjacent storage columns extending in the second direction (Y). The degree of extension from the central storage column is preferably equal on both of these sides. Central storage column is defined as the storage column which is immediately below a robot when the latter has reached a position allowing pick-up of a storage bin.

In order to inter alia allow high vehicle stability both sets of vehicle rolling means is preferably arranged symmetrically around the cavity, for example near the lower corners of the vehicle. At least one, and most preferably both, set(s) of vehicle rolling means may comprise at least four wheels. Other embodiments such as the use two perpendicular oriented caterpillar belts may be envisaged. Furthermore, both sets have an exterior design matching a corresponding exterior design on supporting rails constituting the vehicle support in order to provide increased lateral stability when interconnected. Such supporting rails would be arranged in a two dimensional matrix on top of a bin storing structure or grid, where the principal directions of both the matrix and the grid are congruent with the vehicle's first direction (X) and second direction (Y).

The vehicle may advantageously also include position sensing means to allow measurements of the vehicle position within the storage system during use. This position sensing means may comprise a plurality of position sensors arranged in at least some of the positions on the vehicle body which would transverse the locations of vehicle support where the supporting rails are crossing, for example underneath the vehicle, close to its lower corners.

One or more embodiments of the present invention also relates to a storage system which comprises a remotely operated vehicle in accordance with the above mentioned features, a vehicle support comprising a plurality of supporting rails forming a two dimensional matrix of guiding meshes, wherein the vehicle support is configured to guide the movements of the vehicle in the first direction (X) and the second direction (Y) during use, a bin storing structure or grid supporting the vehicle support comprising a plurality of storage columns, wherein each of the storage columns is arranged to accommodate a vertical stack of storage bins and wherein the main part of the bin storing structure coincides with positions on the vehicle support where the supporting rails are crossing, and a bin lift device arranged to convey a vehicle delivered storage bin in a direction perpendicular to the lateral plane of the vehicle support between the vehicle support and a delivery station.

In a preferred embodiment at least some of the supporting rails arranged at the outer lateral border areas of the vehicle support form outer guiding meshes having reduced average cross sectional areas compared to the average cross sectional area of the remaining guiding meshes in the vehicle support. For example, the average reduced cross sectional areas of the outer guiding meshes may be about half of the average cross sectional area of the remaining guiding meshes in the vehicle support. In a particularly preferred embodiment these cross sectional areas of the outer guiding meshes are reduced only along the second direction (Y) of the vehicle support.

The central arrangement of the cavity in the vehicle body relative to the second direction (Y) effectively remove the undesired torque, thereby improving the stability of the robot or vehicle. This arrangement also results in a lifting and transporting process having a weight distribution with a high degree of symmetry. Furthermore, the novel design allows the same vehicle to be used for lifting and transporting storage bins of heights significantly less than the cavity height (i.e. the height extending from the suspension points of the lifting device and to the lower edge of the vehicle) since the framework/body surrounding at least part of the bin receiving cavity effectively hinders any undesired bin reeling/wobbling. The presence of the cavity surrounding body also allows maintaining full or nearly full lifting speed almost all the way to its end position within the cavity, as well as initiation of stable bin transportations towards the delivery station prior to a fully completed bin lifting from a storage column. The protective body around the cavity also gives the possibility of starting a descent of the lifting device event prior to the time the vehicle has come to a final halt above the storage column in question. A significantly higher stability and time efficiency is thus achieved.

By arranging at least one set of vehicle rolling means fully within the vehicle or robot body additional stability is obtained during the lifting process since the rolling means is situated closer to the storage bin to be lifted. Of the same reason this arrangement reduces the total load on the lifting device. Furthermore, the arrangement is more space efficient relative to the prior art robot illustrated in FIG. 2 since the roller means does not give any additional extensions in at least one of the two robots moving directions (X and Y). Production of smaller sized robots/vehicles is also rendered possible.

These and other characteristics of the invention will be clear from the following description of embodiments of the present invention, given as a non-restrictive examples, with reference to the attached drawings wherein:

DETAILED DESCRIPTION

Figure 1:
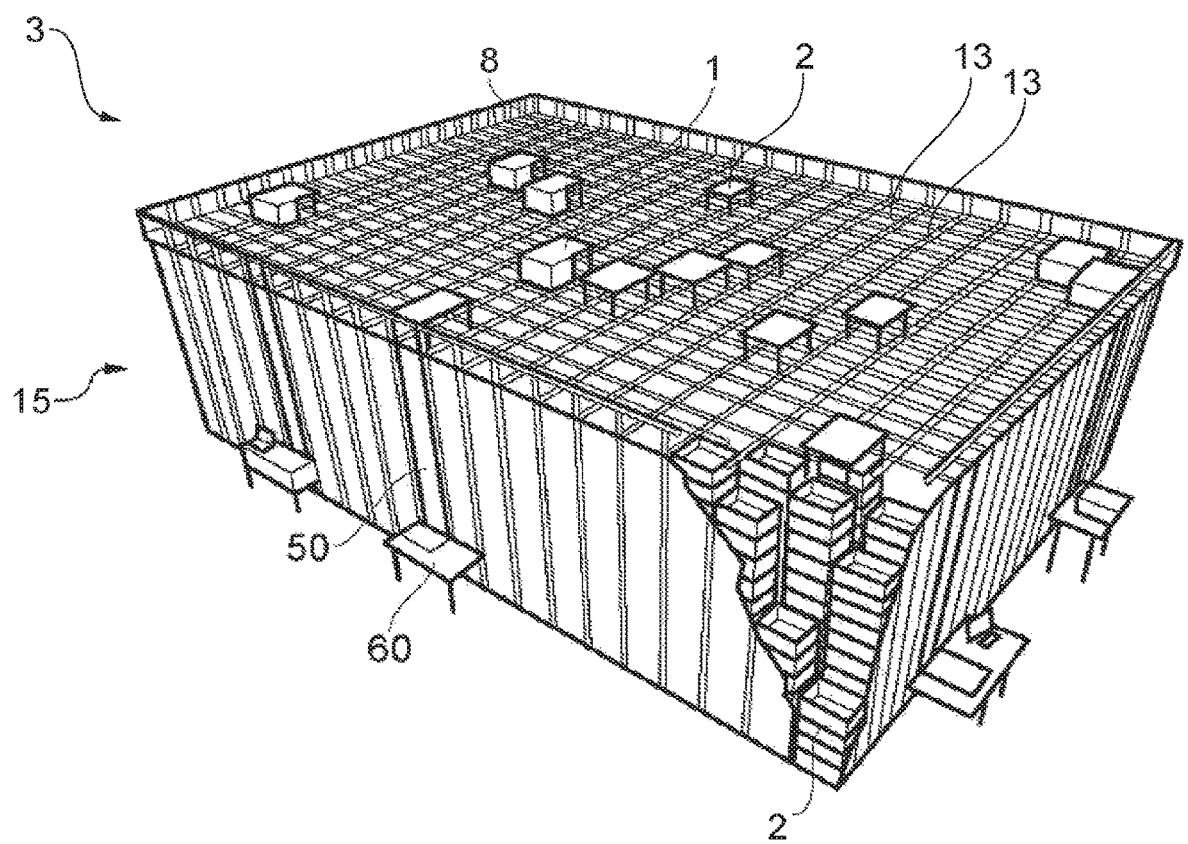
FIG. 1 is a perspective view of a prior art storage system.
Figure 2:
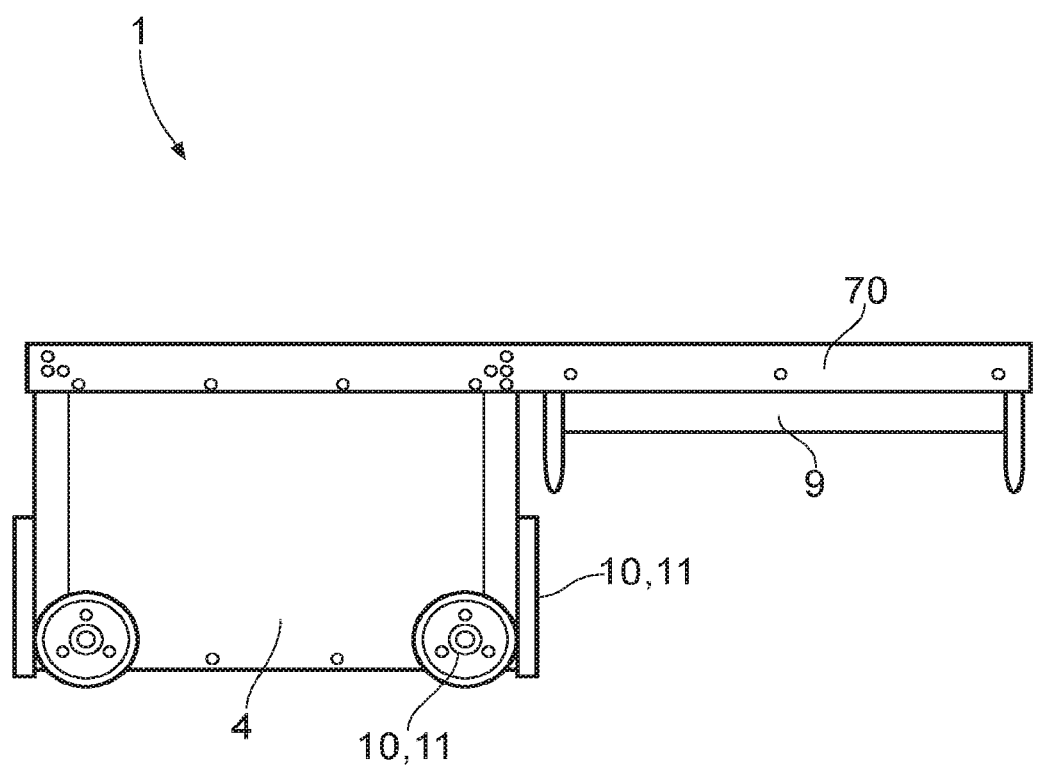
FIG. 2 is a sectional view of a prior art robot or vehicle forming part of a storage system as illustrated in FIG. 1.

FIG. 1 is a schematic, partly cut perspective view of a storage system according to the prior art, and FIG. 2 is a sectional view of a corresponding prior art robot. Both figures have already been referred to earlier in the text.

Figure 3:
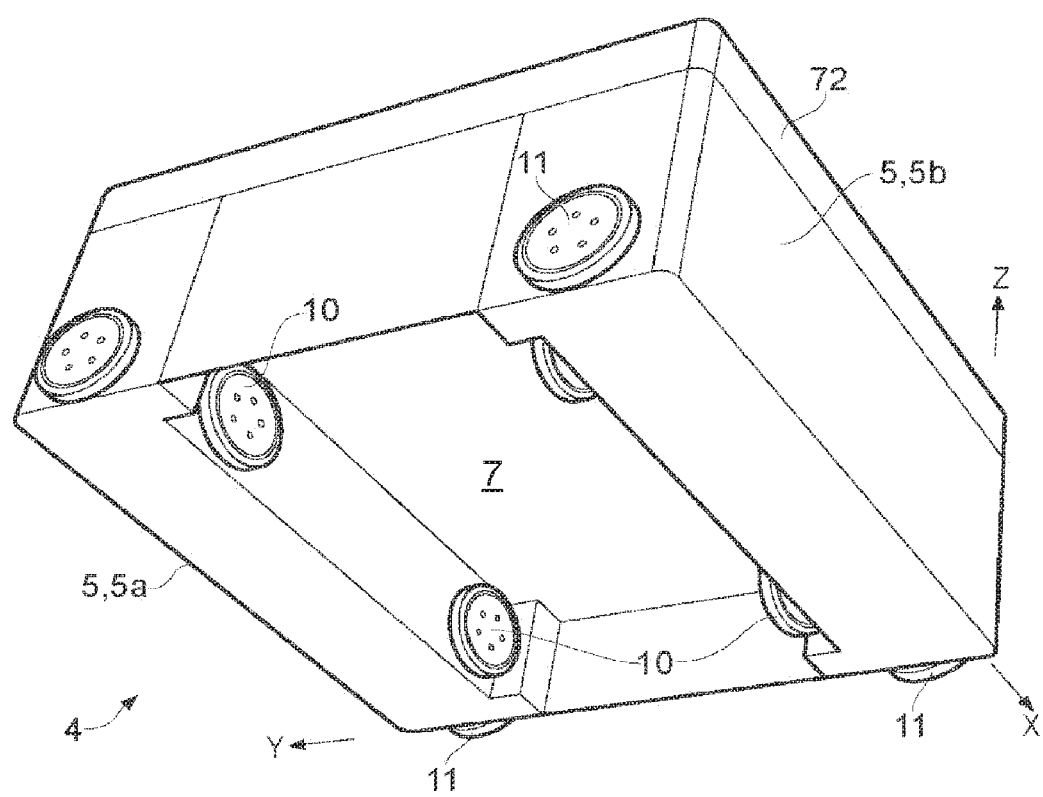
FIG. 3 is a perspective base view of a remotely operated vehicle according to the present invention.
Figure 4:
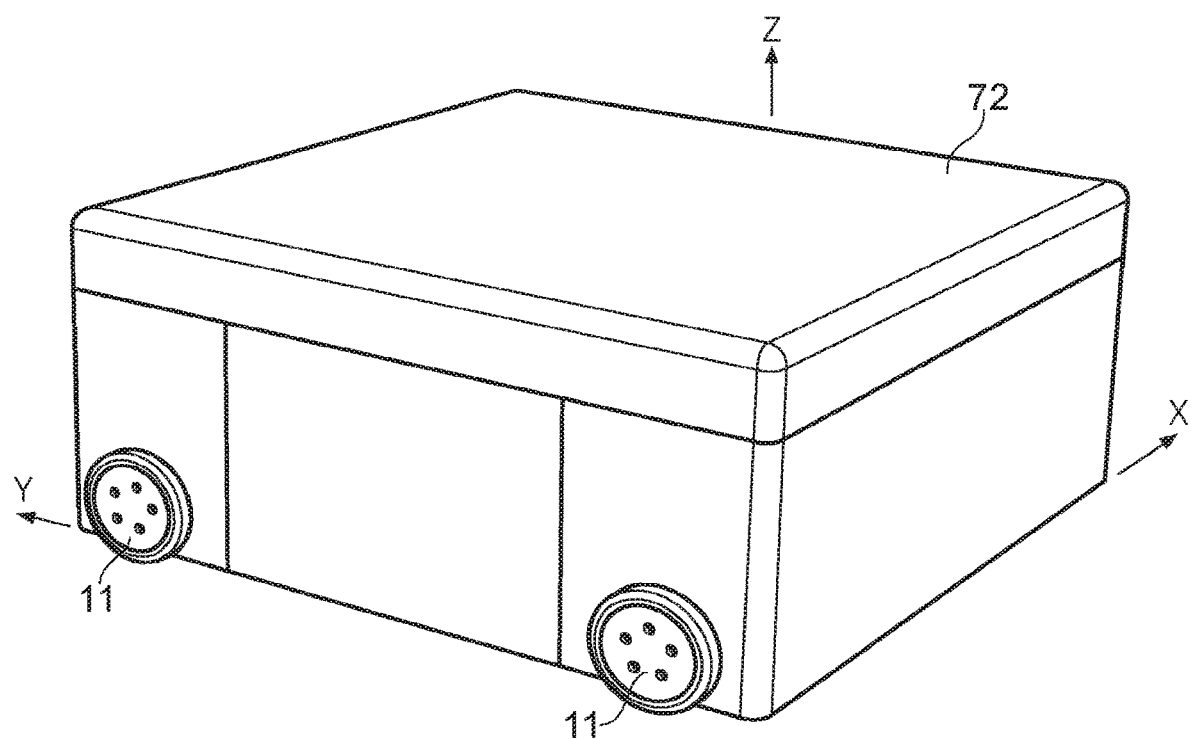
FIG. 4 is a perspective top view of a remotely operated vehicle according to the present invention.

FIGS. 3 and 4 gives a perspective view in two different angles of the inventive robot 1 comprising a rectangular vehicle body or framework 4 with a cavity 7 centrally arranged within the body 4, a top lid 72 covering the top part of the body 4, a first set of four wheels 10 mounted inside the cavity 7 and in parallel to the interior walls of the body 4 and a second set of four wheels 11 mounted in parallel to the exterior walls of the body 4. The first and second set of wheels 10,11 are oriented perpendicular to each other. Further, the vehicle body 4 also includes side parts 5,5a,5b arranged on both sides of the cavity 7 along at least one of the robots 1 direction of movements. For the sake of clarity a Cartesian coordinate system is shown with its X, Y and Z axes aligned along the principal directions of the rectangular vehicle body 4. The size of the cavity 7 is adapted to contain necessary component for a lifting device 9 and to at least completely contain the largest storage bin 2 intended to be picked up by the robot 1.

Figure 5:
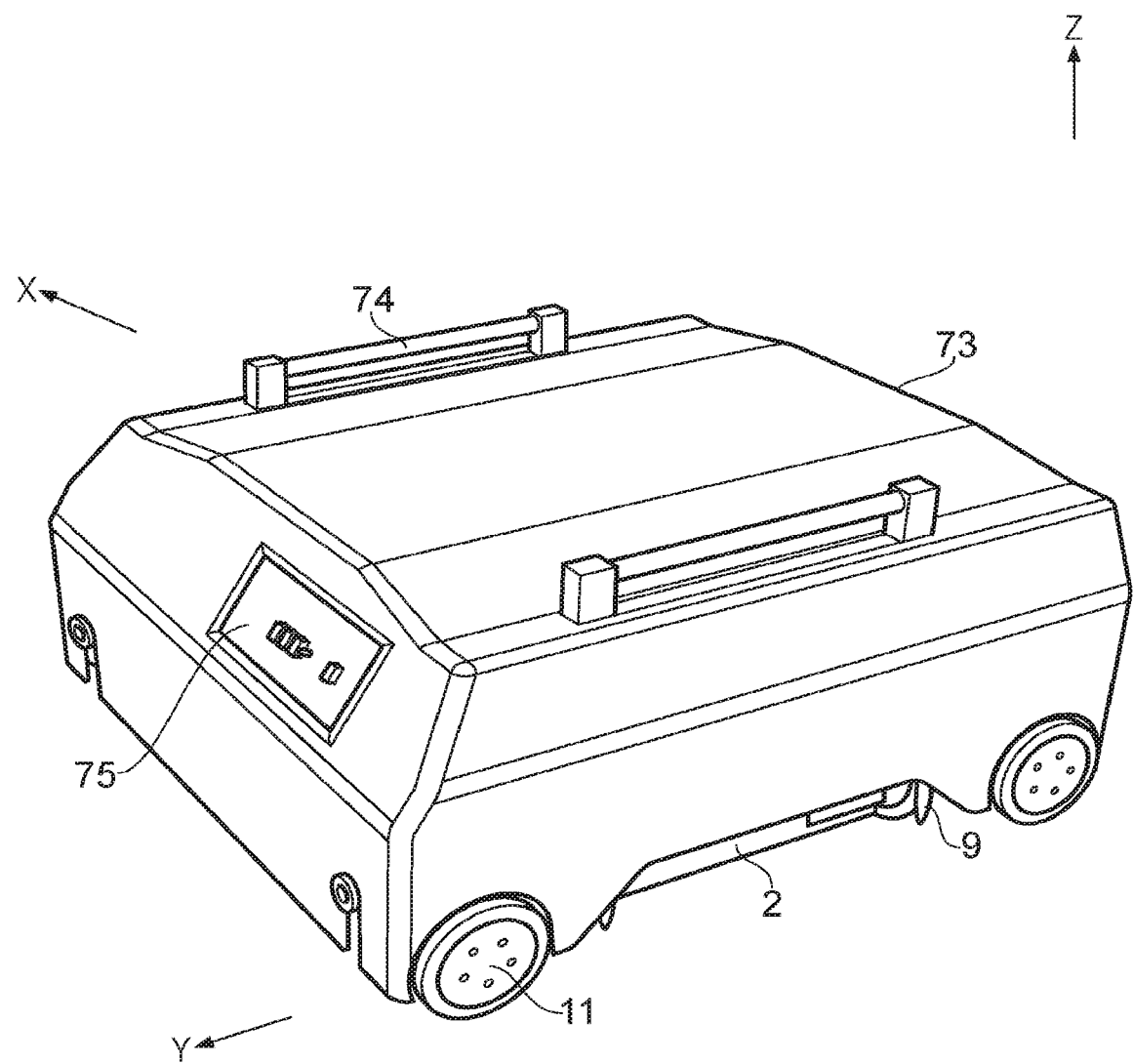
FIG. 5 is a perspective top view of a robot assembly comprising a remotely operated vehicle according to the present invention, a storage bin and a fully enclosing cover.

FIG. 5 gives a perspective view of a robot assembly where the body 4 is completely covered by an enclosing cover 73 comprising handles 74 and transmission means/control panel 75. The design of the enclosing cover 73 is adapted to the particular shape given by the body 4 and the protruding wheels 10. FIG. 5 also shows a small part of a storage bin 2 arranged fully inside the cavity 7 and a small part of the lifting device 9. The latter is preferably composed of inter alia four vertically moveable metal bands suspended on the cavity facing side of the top lid 72 in their upper ends and steering rods at the lower ends capable of being steered and fastened into adapted cavities/areas in the storage bin 2 to be picked.

Figure 6:
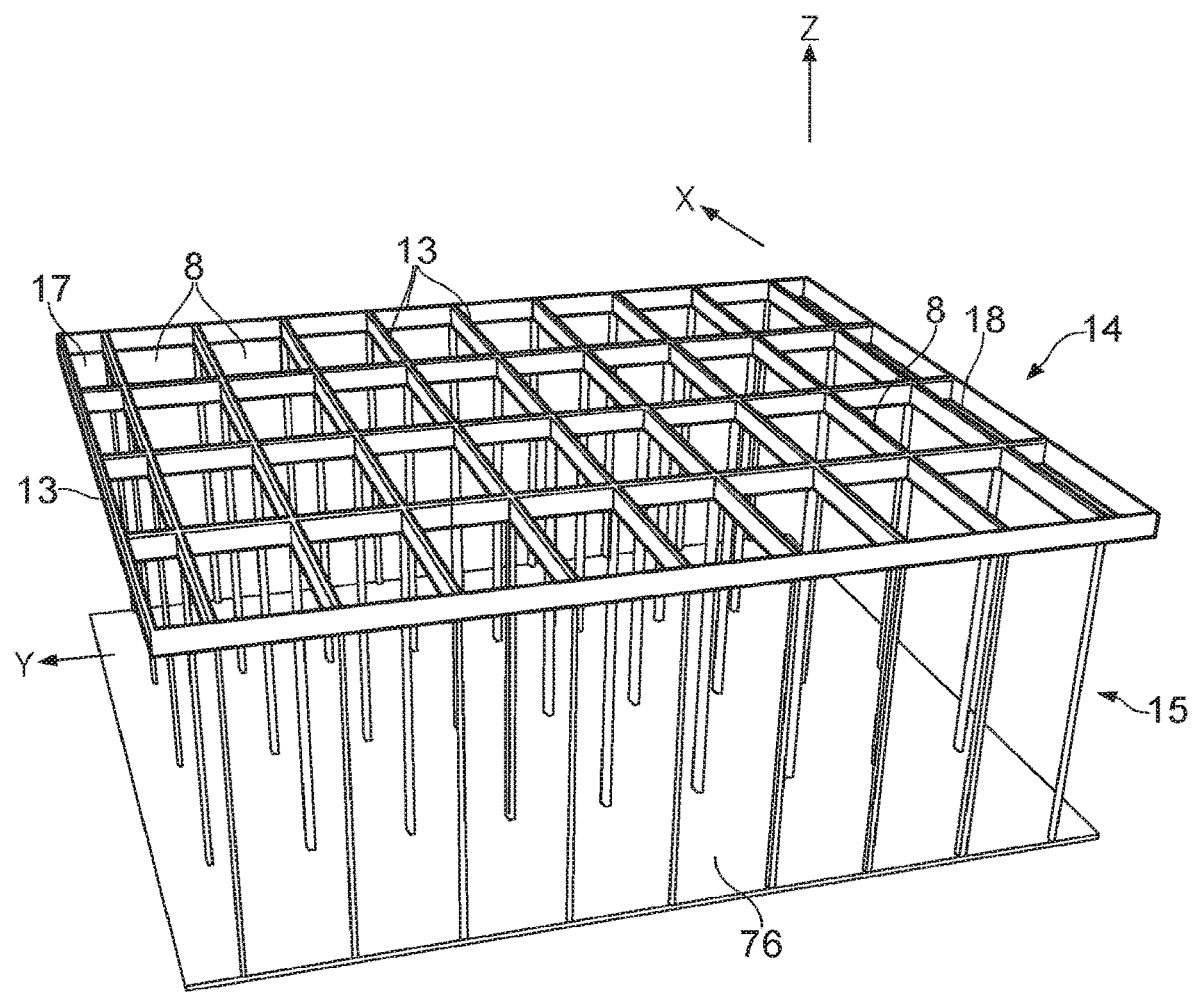
FIG. 6 is a perspective top view of a bin storing grid and a vehicle support in accordance with the present invention.
Figure 7:
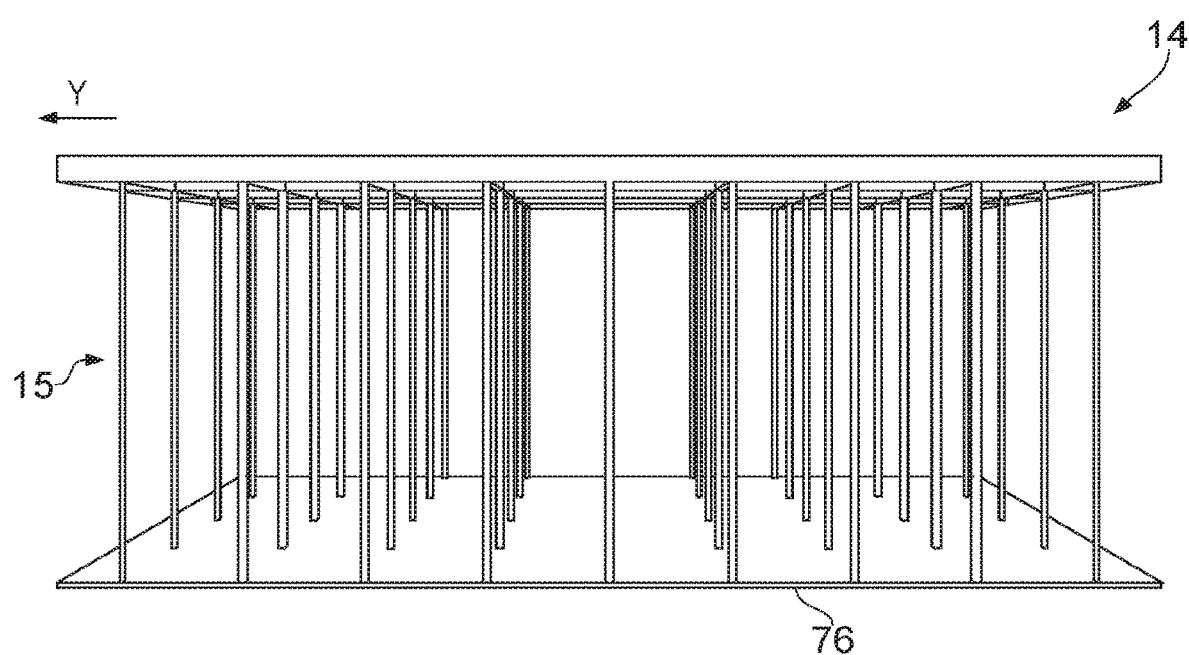
FIG. 7 is a perspective side view of a bin storing grid and a vehicle support in accordance with the present invention.

The structural principles of a grid assembly comprising a bin storing structure or grid 15, integrated supporting rails 13 constituting the vehicle support 14 and a grid supporting base 76 are illustrated in FIGS. 6 and 7. The grid 15 comprises a plurality of pillars being arranged with internal distances adapted to accommodate storage bins 2 to be stored in stacks inside the grid 15. The rectangular arrangements of four adjacent pillars therefore constitute a storage column 8. Both the pillars and the rails 13 may be made of Aluminium. As for FIGS. 3 and 4 a Cartesian coordinate system is shown aligned along the principal directions of the grid assembly to ease the understanding. The supporting rails 13 form a two dimensional matrix of rectangular meshes, and the cross sectional area of most of these meshes coincide with the cross sectional area of each storage columns 8 set up by the underlying grid 15. The meshes at the border area 17,18 of the vehicle support 14 (at both sides in direction Y) is illustrated with cross sectional areas smaller than the remaining meshes. The size of the border meshes 17,18 should preferably be adapted to the degree of extension beyond a central storage column 8a situated immediately below the cavity 7 of the robot 1 when the latter is in a position for initiating pick up of a storage bin 2 contained in the central storage column 8a (see FIGS. 8 and 9). In this way the robot 1 may reach all the storage columns 8 in the storage system 3, i.e. independently of the robot orientation in the Y direction. For example, if the robot 1 extends exactly over the cross sectional area of one central storage column 8a in the X direction and over ½ of the cross sectional area of the adjacent storage column 8b in the Y direction, the cross sectional area of the meshes 17,18 at the border area in the Y direction should be approximately ½ of the cross sectional area of the remaining meshes. The primary function of these border meshes 17,18 is thus to allow sufficient space for the robot 1 having the novel design.

Figure 8:
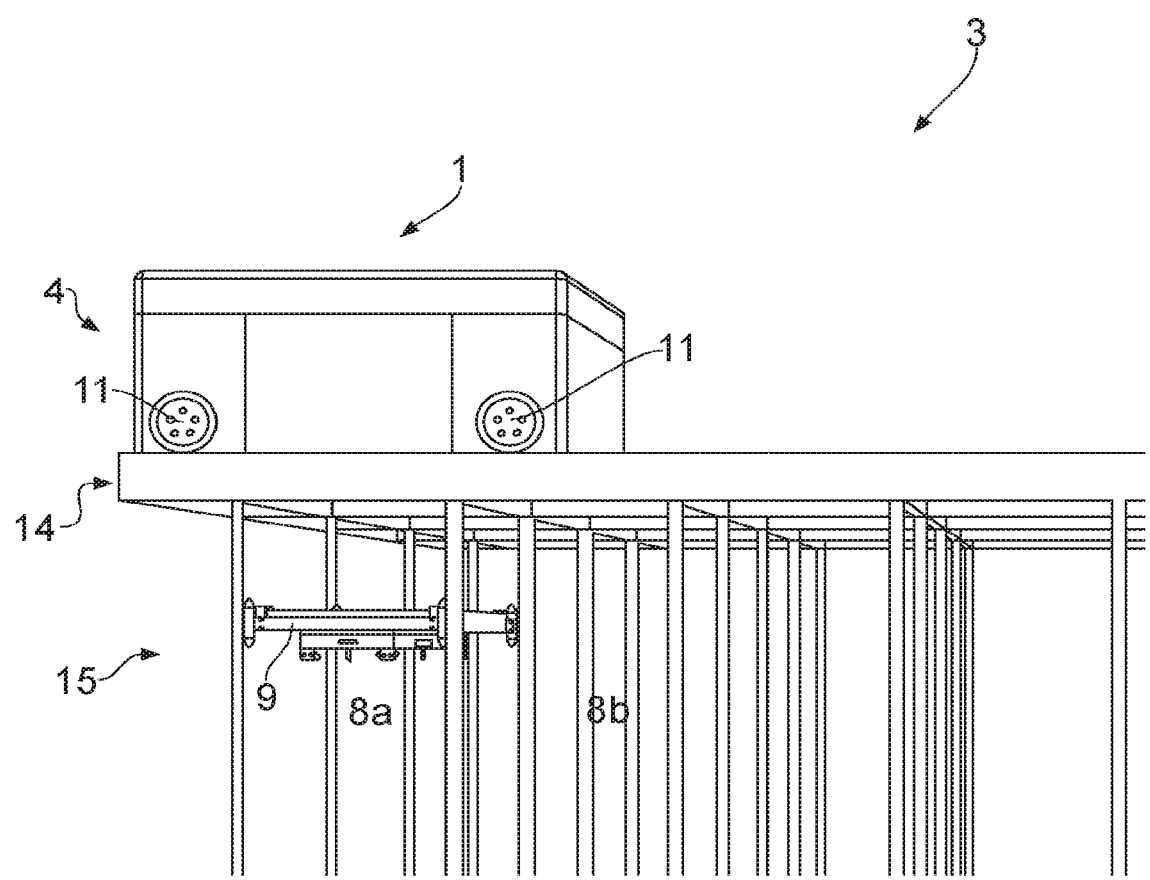
FIG. 8 is a perspective side view of part of a storage system in accordance with the present invention including a bin storing grid, a vehicle support and a remotely operated vehicle.

FIG. 8 shows the robot 1 in a lifting position above the central storage column 8a adjacent to the border area 17,18 of the grid assembly. The vehicle lifting device 9 is in this embodiment lowered a distance into the central storage column 8a in order to hook onto and lift up the underlying storage bin 2. As seen in the exemplary situation in FIG. 8 the robot 1, having the body 4 extended in the Y direction compared to the X direction, may be driven all the way to the edge of the grid 15 when the border area is designed with additional border meshes 17,18 with a Y directional width approximately ½ of the Y directional widths of the remaining meshes in the grid 15.

Figure 9:
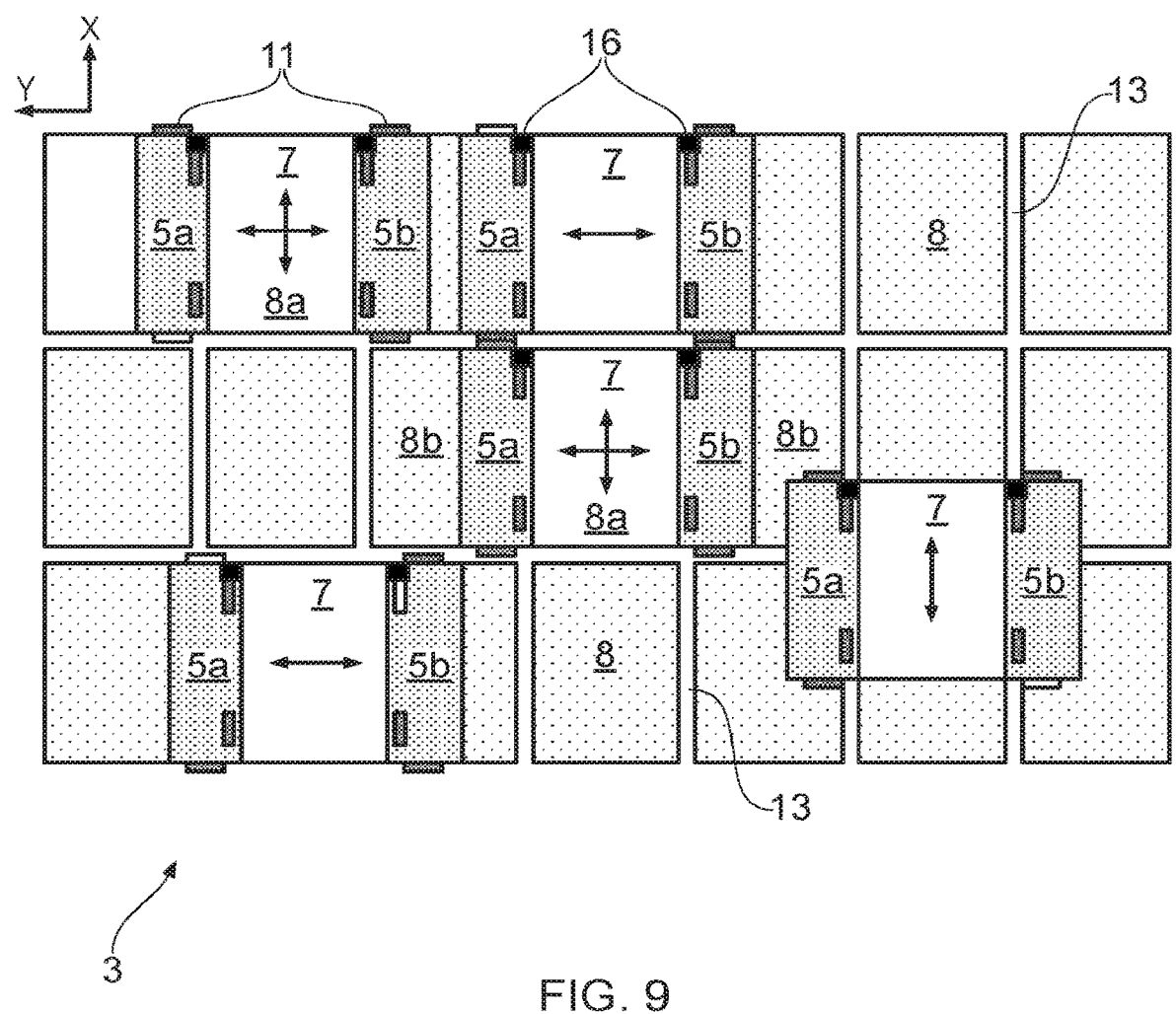
FIG. 9 is a schematic top view of a remotely operated vehicle moving on a two dimensional matrix of supporting rails.

To better illustrate the movement of the robot 1 on the supporting rails 13 constituting the vehicle support 14 some exemplary positions of robots 1 on a grid assembly is illustrated in FIG. 9. The thick arrows drawn in the centre of the robots 1 indicate allowed moving directions. When the robot 1 is situated with its cavity 7 exactly above a central storage column 8a, as is the case for the top left and mid centred robot 1, the arrangement of the supporting rails 13 allow movement in both X and Y directions. Any other positions on the grid assembly restrict the robot's 1 movement on the vehicle support 14 either in X direction (lower right robot 1) or in Y direction (top centered and bottom left robot 1). To allow determination of the robot position it is considered advantageous to equip each robot 1 with one or more position sensors 16, for example optical sensors. Such sensors should 16 preferably be mounted in one or more areas of the robot 1 which ensures that the sensors 16 have both non-obstructed view to the underlying supporting rails 13 and that they pass directly above or close to the positions on the vehicle support 14 in which the rails 13 are crossing. The readings from the sensors 16 may inter alia dictate the further movement of the robot 1 and/or the operation of the vehicle lifting device 9.

All operations of the robot 1 are controlled by wireless communication means 75 and remote control units. This includes control of the robot movement, the vehicle lifting device and the position measurements.

In the preceding description, various aspects of the apparatus according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to persons skilled in the art to which the disclosed subject matter pertains, are deemed to lie within the scope of the present invention.

LIST OF REFERENCE NUMERALS/LETTERS

1 Remotely operated vehicle/robot
2 Storage bin
3 Storage system
4 Vehicle body/framework
5 First section (of vehicle body)/component section/side parts
5a First section, left
5b First section, right
6 Vehicle driving means/motor unit
7 Vehicle storage space/second part/cavity/centrally arranged cavity
8 Storage column
8a Central storage column
8b Adjacent storage column
9 Vehicle lifting device
10 First set of vehicle rolling means/First set of wheels
11 Second set of vehicle rolling means/Second set of wheels
12 Bin receiving opening
13 Supporting rail
14 Vehicle support
15 Bin storing structure/grid
16 Position sensing means/position sensor
17 Left outer lateral border area of vehicle support/left border mesh
18 Right outer lateral border area of vehicle support/right border mesh
50 Bin lift device 60 Delivery station/port
70 Yoke/overhang
72 Top lid
73 Enclosing cover
74 Handles
75 Transmission means/control panel/wireless communication means
76 Grid supporting base

The invention claimed is:

1. A method of operating a bin storage system comprising a plurality of storage columns for storage of a plurality of vertically-stacked storage bins, and a plurality of robot vehicles for transporting storage bins, the method comprises:
   positioning a cavity of one of the plurality of robot vehicles such that the cavity is aligned with one of the storage columns,
   receiving a storage bin from the storage column into the cavity, and
   moving the robot vehicle along the bin storage system, using a plurality of rolling members attached to the robot vehicle that are arranged for travelling in a first direction and a perpendicular second direction along the bin storage system.

2. The method according to claim 1, wherein the receiving a storage bin from the storage column comprises:
   descending a lifting device of the robot vehicle into the storage column,
   engaging a storage bin with the lifting device, and
   lifting the lifting device of the robot vehicle with the storage bin from the storage column into the cavity.

3. The method according to claim 1, wherein the cavity is capable of receiving only one storage bin at any time.

4. The method according to claim 1, wherein the cavity is centrally arranged when viewing from a bottom of the robot vehicle.

5. The method according to claim 1, wherein the cavity displays a downwardly facing opening for the storage bin.

6. The method according to claim 1, wherein at least a pair of rolling members are arranged symmetrically around the cavity.

7. A robot vehicle for transporting storage bins in a bin storage system, comprising:
   a cavity arranged to receive a storage bin from a storage column,
   a plurality of rolling members arranged to allow the robot vehicle to travel in a first direction and a perpendicular second direction along an underlying vehicle support of the bin storage system, and
   means for reversibly and selectively displacing a first set of rolling members and a second set of rolling members away from the underlying vehicle support of the storage system during a change of vehicle direction between the first direction and the second direction.

8. The robot vehicle according to claim 7, wherein the cavity is centrally arranged in the robot vehicle.

9. The robot vehicle according to claim 7, wherein the cavity displays a downwardly facing opening for the storage bin.

10. The robot vehicle according to claim 7, wherein at least a pair of rolling members are arranged symmetrically around the cavity.

11. The robot vehicle according to claim 7, wherein the bin storage system comprises:
   three-dimensional storage structure comprising a plurality of pillars which are positioned with internal distances and in a rectangular arrangement, wherein the rectangular arrangement of the pillars define the storage columns for the storage of a plurality of vertically-stacked storage bins, and
   supporting rails arranged in a two-dimensional matrix on the pillars, said supporting rails arranged in a first direction and a second direction orthogonal to the first direction, the supporting rails further defining openings for the storage columns.

12. The robot vehicle according to claim 11, wherein the plurality of rolling members are arranged for travelling along a plurality of rolling tracks of the bin storage system, and the supporting rails define the rolling tracks.

13. A robot vehicle for transporting storage bins in a bin storage system, comprising:
   a cavity arranged to receive a storage bin from a storage column,
   a plurality of rolling members arranged to allow the robot vehicle to travel in a first and second direction along an underlying vehicle support of the bin storage system, wherein the rolling members, in at least one of the first and second direction, are arranged at an outermost periphery of the robot vehicle, and
   means for reversibly and selectively displacing a first set of rolling members and a second set of rolling members away from the underlying vehicle support of the storage system during a change of vehicle direction between the first direction and the second direction.

14. The robot vehicle according to claim 13, wherein all components of the robot vehicle, except for the rolling members, do not extend beyond any of the rolling members.

15. The robot vehicle according to claim 13, wherein the cavity comprises a downwardly facing opening of essentially a same width and length as the openings for the storage columns.

16. The robot vehicle according to claim 13, wherein a single robot vehicle essentially covers a single opening while retrieving a storage bin, whereby a second robot vehicle traverses an adjacent column unhindered by the first robot vehicle.

17. A computer program product for a control unit in a bin storage system comprising: a plurality of storage columns for storage of a plurality of vertically-stacked storage bins, and a plurality of robot vehicles for transporting storage bins, the computer program product comprises instructions that when executed on the control unit performs a method of operating the bin storage system, the method comprises:
   positioning a cavity of one of the plurality of robot vehicles such that the cavity is aligned with one of the storage columns,
   receiving a storage bin from the storage column into the cavity, and
   moving the robot vehicle along the bin storage system, using a plurality of rolling members attached to the robot vehicle that are arranged for travelling in a first direction and a perpendicular second direction along the bin storage system.

* * * * *